United States Patent
Rao (12) 
(10) Patent No.: US 6,351,878 B1
(45) Date of Patent: Mar. 5, 2002

(54) METHOD FOR MAKING POSITIVE GRIDS AND LEAD-ACID CELLS AND BATTERIES USING SUCH GRIDS

(75) Inventor: Purushothama Rao, Aurora, IL (US)

(73) Assignee: GNB Technologies, Inc., Alpharetta, GA (US)

(*) Notice: Subject to any disclaimer, the term of this patent is extended or adjusted under 35 U.S.C. 154(b) by 0 days.

(21) Appl. No.: 09/285,624

(22) Filed: Apr. 3, 1999

(51) Int. Cl.[7] .................................................. B23P 13/00
(52) U.S. Cl. .............................. 29/2; 29/623.1; 429/233
(58) Field of Search ...................... 29/2, 623.1; 429/233, 429/234, 225, 228, 242, 245

(56) References Cited

U.S. PATENT DOCUMENTS 5,834,141 A * 11/1998 Anderson et al. ........... 429/245
5,871,862 A * 2/1999 Olson .......................... 429/217
5,874,186 A * 2/1999 Rao et al. .................... 429/242
5,858,575 A * 9/1999 Chen ........................... 429/245
5,948,566 A * 9/1999 Larsen et al. ................ 429/225

FOREIGN PATENT DOCUMENTS

ES 2 110 365 2/1998

* cited by examiner

Primary Examiner—Stephen Kalafut
Assistant Examiner—Raymond Alejandro
(74) Attorney, Agent, or Firm—Leydig, Voit & Mayer, Ltd.

(57) ABSTRACT

A method for making positive grids for lead-acid batteries from calcium-tin-silver lead-based alloys comprises casting an alloy strip and then rolling the strip at a temperature between about the solvus temperature and the peritectic temperature of the alloy, quenching the rolled strip, then, preferably, heat aging at a temperature of 200° F. to 500° F., and fabricating into the positive grid, such grids having enhanced mechanical and high temperature corrosion resistance characteristics.

8 Claims, 4 Drawing Sheets

METHOD FOR MAKING POSITIVE GRIDS AND LEAD-ACID CELLS AND BATTERIES USING SUCH GRIDS

TECHNICAL FIELD OF THE INVENTION

The present invention relates to lead-acid cells and batteries, and, more particularly, to a method for making positive grids using calcium-tin-silver lead-based alloys.

BACKGROUND OF THE INVENTION

Over the last 20 or so years, there has been substantial interest in automotive-type, lead-acid batteries which require, once in service, little, or more desirably, no further maintenance throughout the expected life of the battery. This type of battery is usually termed a "low maintenance" or "maintenance-free battery." The terminology maintenance-free battery will be used herein to include low maintenance batteries as well. This type of battery was first commercially introduced in about 1972 and is currently in widespread use.

It has been well recognized over the years that lead-acid batteries are perishable products. Eventually, such batteries in service will fail through one or more of several failure modes. Among these failure modes are failure due to positive grid corrosion and excessive water loss. The thrust of maintenance-free batteries has been to provide a battery that would forestall the failure during service for a period of time considered commensurate with the expected service life of the battery, e.g., three to five years or so.

To achieve this objective, the positive grids used initially for maintenance-free batteries typically had thicknesses of about 60 to about 70 mils or so. The batteries were likewise configured to provide an excess of the electrolyte over that needed to provide the rated capacity of the battery. In that fashion, by filling the electrolyte to a level above that of the top of the battery plates, maintenance-free batteries contained, in effect, a reservoir of electrolyte available to compensate for the water loss occurring during the service life of the battery. In other words, while the use of appropriate grid alloys will reduce water loss during the service life of the battery, there will always be some water loss in service.

The principal criteria for providing satisfactory positive grids for starting, lighting, and ignition ("SLI") automotive lead-acid batteries are stringent and are varied. In general, and by way of a summary, suitable alloys must be capable of being cast into satisfactory grids and must impart adequate mechanical properties to the grid. Still further, the alloys must impart satisfactory electrical performance to the battery in the intended application. Satisfactory alloys thus must impart the desired corrosion resistance, and avoid positive active material softening that will result in a loss of capacity.

More particularly, and considering each of the criteria previously summarized, suitable alloys in the first instance must be capable of being cast into grids by the desired technique, i.e., the cast grids must be low in defects as is known (e.g., relative freedom from voids, tears, microcracks and the like). Such casting techniques range from conventional gravity casting ("book molds" or the like) to continuous processes using expanded metal techniques and to a variety of processes using alloy strips from which the grids are made, e.g., by stamping or the like.

The resulting cast grids need to be strong enough to endure processing into plates and assembly into batteries in conventionally used equipment. Even further, suitable grids must maintain satisfactory mechanical properties throughout the expected service life. Any substantial loss in the desired mechanical properties during service life can adversely impact upon the battery performance as will be more fully discussed hereinafter.

Considering now the electrochemical performance required, the grid alloy for the positive plates must yield a battery having adequate corrosion resistance. Yet, the use of a continuous direct casting process, or other processes using grid alloy strips, desirable from the standpoint of economics, ostensibly can compromise corrosion resistance. Continuous processes thus orient the grains in the grids, thereby making the intergranular path shorter and more susceptible to corrosion attack and to early failures. Casting a thick strip and then cold rolling or the like to the grid thickness desired even further exacerbates the problem.

Positive grid corrosion thus can be a primary mode of failure of SLI lead-acid batteries, particularly at higher ambient temperatures. When positive grid corrosion occurs, this lowers the electrical conductivity of the battery itself. Battery failure occurs when the corrosion-induced decrease in the conductivity of the grid causes the discharge voltage to drop below a value acceptable for a particular application.

A second failure mechanism, also associated with positive grid corrosion, involves failure due to "grid growth." During the service life of a lead-acid battery, the positive grid corrodes; and the corrosion products form on the surface of the grid. In most cases, the corrosion products form at the grain boundaries and grid surface of the positive grid where the corrosion process has penetrated the interior of the "wires" of the grid. These corrosion products are generally much harder than the lead alloy forming the grid and are less dense and thus occupy a larger volume. Due to the stresses created by these conditions, the grid alloy moves or grows to accommodate the bulky corrosion products. This physical displacement of the grid causes an increase in the length and/or width of the grid. The increase in size of the grid may be non-uniform. A corrosion-induced change in the dimension of the grid is generally called "grid growth" (or sometimes "creep").

When grid growth occurs, the movement and expansion of the grid begins to break the electrical contact between the positive active material and the grid itself. This movement and expansion prevents the passage of electricity from some reaction sites to the grid and thereby lowers the electrical discharge capacity of the cell. As this grid growth continues, more of the positive active material becomes electrically isolated from the grid and the discharge capacity of the cell decays below that required for the particular application. The mechanical properties of the alloy thus are important to avoid undue creep during service life.

As is now appreciated, what has occurred in the last several years is the substantial increase in the under-the-hood temperature to which the battery is exposed in automobile service. Obviously, the under-the-hood temperature is particularly high in the warmer climates. One automobile manufacturer has perceived that the temperature to which an SLI battery is exposed under-the-hood in such warmer climates has risen from about 125° F. to about 165° F.–190° F. in new automobiles.

The specific temperature increase which is involved is not particularly important. What is important is that such under-the-hood temperatures have in fact increased. The impact of the under-the-hood vehicle service temperature increases on the failure modes has been to substantially increase the occurrence of premature battery failures. The incidence of premature battery failures due to excessive positive grid corrosion has been significant.

A breakthrough was achieved in utilizing the positive grid alloys disclosed in U.S. Pat. No. 5,298,350 to Rao. Utilizing such positive grid alloys provided batteries that exhibited substantial improvements in service life and have effectively eliminated premature positive grid corrosion at elevated temperatures as being the primary mode of failure.

The subject Rao patent has spurred considerable interest in the type of positive grid alloys utilized, i.e., calcium-tin-silver lead-based alloys. Thus, substantial effort has been made to investigate this type of alloy through testing of various properties with varying levels of the alloying constituents.

The interest has also extended to utilizing this family of alloys in sealed lead-acid cells and batteries (often termed "VRLA," viz., valve-regulated lead-acid). Sealed lead-acid cells and batteries are widely used in commerce today for various applications. In one type of application, generally termed as stationary applications, lead-acid cells and batteries are used, for example, for load leveling, emergency lighting in commercial buildings, as standby power for cable television systems, and in uninterruptible power supplies. The uninterruptible power supply may be used to back up electronic equipment, such as, for example, telecommunication and computer systems, and even as a back up energy source for entire manufacturing plants. When the principal power supply to the electronic equipment or the like has been cut off, such as during a power outage, the sealed cells (typically many electrically connected together) provide a source of reserve power to allow the telecommunication or computer system to remain operational until the principal power system can be restored. The uninterruptible power supply also will accommodate short, or intermittent, losses in power, so that the function of electronic equipment will not be impaired during a brief power outage.

In addition, there are many applications where sealed lead-acid cells and batteries are used in what are termed motive power applications. Such applications are thus electrical vehicles, fork-lift trucks, and the like, where such cells and batteries are used as the power source.

In many of these applications where sealed cells and batteries are used, the size of such cells and batteries and the necessary service life requirements necessitate that relatively thick grids be utilized in relation to the thickness of grids typically utilized for SLI applications. More particularly, grid thicknesses of 0.1 inch or more are often required.

What has also occurred in the last several years are a variety of processes which utilize alloy strips to make grids, and often in a continuous, or semi-continuous, fashion. The desirability of such continuous plate-making processes is to achieve higher grid production rates as well as to improve plate quality in comparison to the production and quality issues associated with using conventional gravity cast techniques. One process for making a directly cast alloy continuous strip from molten lead alloys is commercially available (Cominco Ltd., Toronto, Canada). U.S. Pat. No. 5,462,109 to Vincze et al. discloses a method for making a directly cast strip. This directly cast strip can then be converted by known expanded metal fabrication techniques to achieve a continuous source of an expanded lead-alloy grid mesh strip suitable for conversion into positive lead-acid battery plates. U.S. Pat. No. 5,434,025 to Rao et al. discloses batteries and positive grids made from cast strips which achieve high temperature corrosion resistance while utilizing calcium-tin-silver lead-based alloys.

Other types of grid manufacturing processes involve first casting a continuous length billet having a thickness in the range of, for example, 0.25 to 1.0 inch. Such a billet is then mechanically rolled continuously to a thickness reduction in the range of 10–15:1. The finished roll strip may then be made into grids by a variety of commercially available techniques. Such techniques have often been termed "expanded metal" techniques, which techniques typically involve slitting the strip and expanding the slit strip, creating a grid mesh having diamond-shaped openings, hence the reference to the "expanded metal" terminology. Alternatively, die punching or any other technique proposed and/or used to make grids from the rolled strip can be employed.

What has not been appreciated, it is believed, is the substantial adverse effect upon the microstructure of the thus-rolled strips and the concomitant effect upon the desired corrosion resistance and grid growth characteristics of grids made from such strips. More particularly, in the rolling process whereby the alloy strip is created from the cast billet, the stability of the microstructure may be lowered, both non-uniform and higher rates of matrix recrystallization can result. Such results can increase the susceptibility to intergranular corrosion. These higher rates of matrix recrystallization in such rolled alloys may well be due to the excess strain energy absorbed during rolling. The recrystallization temperature of the alloy may thereby be lowered due to the excess strain energy and the magnitude of lattice defects present in the matrix, in turn, due to the heavy structure deformation at the lower recrystallization temperature.

The significance, at least in part, is that the precipitation in the matrix in Pb—Ca—Sn and Pb—Ca—Sn—Ag alloys will be non-uniform; and recrystallization may well result in localized movement of large angle grain boundaries. Recrystallization results in non-uniform grain growth in the lead-rich matrix. Excessive grain boundary movements also result in pulling adjacent precipitate particles together which could coalesce to form agglomerates. This will tend to increase the precipitate size, also increasing the interparticle spacing, both of which will reduce the effectiveness of the precipitates in matrix strengthening, thereby contributing to loss of ductility and toughness. Precipitate coarsening could also lead to grain boundary precipitation and accordingly make the alloy more susceptible to catastrophic intergranular corrosion in battery life. Such matrix recrystallization may also result in reduction in the creep rate of these alloys which will, in turn, exhibit higher grid growth rates in battery service so as to limit the useful service life.

In view of the production and quality improvement capable of being achieved by making grids from cast strips, there exists a clear need for methods capable of utilizing the substantial benefits that can be achieved using the calcium-tin-silver lead-based alloys, while not unduly limiting the potential advantageous properties.

Accordingly, it is an object of the present invention to provide a method for making positive grids and plates for a lead-acid battery utilizing a rolled or wrought strip.

It is an additional object of the invention to provide lead-acid cells and batteries utilizing positive grids made with such a method.

Another object of this invention is to provide such method in which the wrought strip produced, made utilizing calcium-tin-silver lead-based alloys, is characterized by superior microstructure stability, stable and uniformly dispersed $(PbAgSn)_3Ca$-type precipitates, lower rates of matrix strain hardening, strain energy and residual stresses, equiaxed and honeycomb grain structure, and a matrix relatively resistant to recrystallization and corrosion.

Other objects and advantages of the present invention can be seen from the following description of the invention.

BRIEF SUMMARY OF THE INVENTION

In general, the method of the present invention involves carefully controlling the rolling of the billet so as to provide positive grids made from calcium-tin-silver lead-based alloys which have highly beneficial properties. Indeed, such positive grids are considered to be ideally suited for sealed lead-acid cells and batteries that are intended for relatively long term service lives. On the other hand, if desired for use in SLI lead-acid battery applications and the like, the use of grids made using the methods of the present invention should possess such inherently high corrosion resistance that the grid thickness and weight can be reduced, if desired, by anywhere from about 5% to 10% or so. Reductions of this level provide a potential economic reward that is considerable.

As will be discussed more particularly hereinafter, the method of the present invention involves casting the billet, then rolling at a controlled temperature which is above the solvus, and is somewhat less than the peritectic, temperature for the defined calcium concentration in the alloy, quenching the rolled strip to preserve the supersaturated, lead-rich solid solution, and then maintaining the rolled strip at selected temperatures until ready for conversion into grids.

According to a more preferred embodiment of the present invention, it has been found that subjecting the rolled strip to a controlled artificial aging sequence can further enhance the corrosion resistance of grids made using the present invention. Thus, as will be discussed hereinafter, such a controlled artificial aging sequence can be utilized to reduce intergranular corrosion.

DESCRIPTION OF THE PREFERRED EMBODIMENTS

As to the preferred alloy composition utilized, any desired calcium-tin-silver lead-based alloy may be used which possesses the characteristics desired for the particular application. In this regard, the type of application may, at least in part, play a principal part in the selection of a particular alloy composition. For example, for sealed lead-acid cells and batteries, alloy compositions should be selected that are considered to impart to the resulting grid enhanced resistance to grid growth when relatively large sealed cells and batteries are necessary. Similarly, such compositions should be selected so as to minimize, if not eliminate, any thermal runaway issues. Alloys intended for SLI automotive batteries preferably contain calcium in the range of 0.035–0.065%, tin in the range of 0.5–1.5%, and silver in the range of 0.02–0.045%. The calcium content and the silver content are slightly higher and would be acceptable for automotive batteries as they are expected to last three-five years.

More broadly, the alloy compositions for use in the present invention include, based upon the weight of the resulting strip, from about 0.025% to 0.065% calcium, from about 0.4% to 1.9% tin, and from about 0.015% to 0.050% silver. If desired, aluminum can be present in an amount effective to reduce the drossing of the calcium from the resulting alloy. Suitable amounts are known, and an illustrative range can vary from about 0.003% to about 0.03% by weight.

Still further, in the most preferred embodiment, it is desired to minimize the level of trace elements in the alloy composition. Of course, other ingredients may be added to the alloy if desired, provided the beneficial properties of the alloy are not disturbed by the addition of such ingredients. Set forth below in Table 1 is the most preferred maximum level for various trace elements:

TABLE 1

| Element | Composition in Wt. % |
| --- | --- |
| Copper | 0.050 |
| Bismuth | 0.040 |
| Sulfur | 0.0010 |
| Tellurium | 0.00050 |
| Nickel | 0.00030 |
| Iron | 0.0020 |
| Cadmium | 0.0020 |
| Zinc | 0.0020 |

Copper is limited to a maximum concentration of 0.05%, as higher levels might induce grain boundary embrittlement and increase the rate of gassing and self-discharge. Bismuth content should be maintained below 0.04% to minimize alloy drossing during casting as well as to minimize adverse effects on corrosion resistance. Tellurium and nickel impurity limits are set at 5 and 3 ppm levels to minimize the adverse effects of lowering hydrogen over-voltage and thus increasing gassing and water loss in MF batteries and sealed batteries. Iron content is held at 20 ppm to minimize the adverse effects on the self-discharging rate in the battery.

Further, addition of tin to the calcium-lead alloy family tends to lower the equilibrium solubility of calcium to achieve supersaturation. This should be kept in mind as the tin content in the alloy composition used is increased. This is one of the principal reasons why the preferred compositions utilize no more than about 1.9 wt. % tin. However, depending upon the application and requirements, it may be suitable to use alloys of this family containing tin up to 2% by weight, perhaps even up to 3% by weight or so.

The alloy preferably is prepared by blending the ingredients at temperatures of about 800° F. to about 950° F. (426° C. to about 510° C.) until a homogeneous mixture is achieved, and allowing the ingredients to cool. The particular manner in which the alloys of this invention are prepared does not form a part of the present invention. Any desired alloying technique that is normally used for making alloys of this type will be acceptable in producing the starting Ca—Sn—Ag—Pb alloy for further processing.

Figure 1:
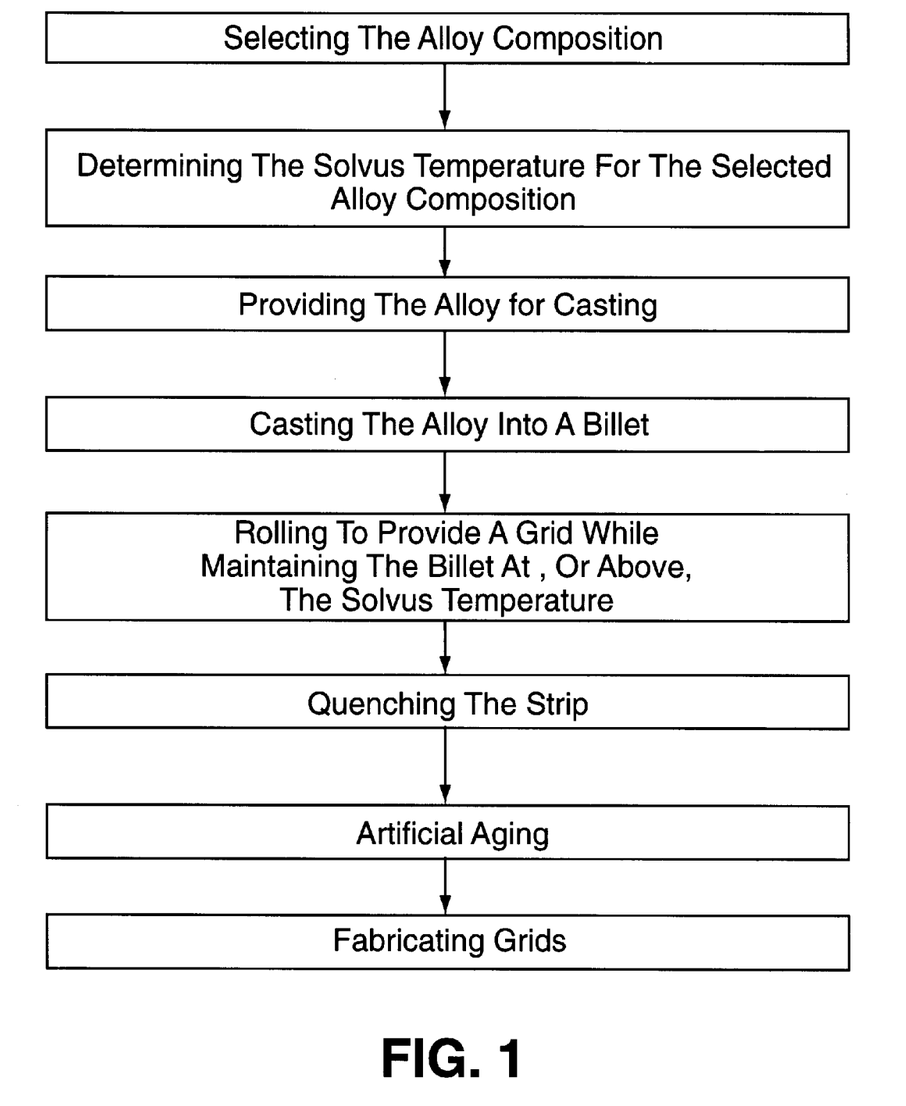
FIG. 1 is a block diagram showing the method of the present invention.

FIG. 1 is a process flow diagram showing the method of the present invention. The particular calcium-tin-silver lead-based alloy composition desired for the particular grids is first selected. Thereafter, in accordance with one aspect of the present invention, the solvus temperature for the selected alloy composition is determined, which solvus temperature is then used to determine the temperature at which rolling is carried out as will be discussed hereinafter.

Figure 2:
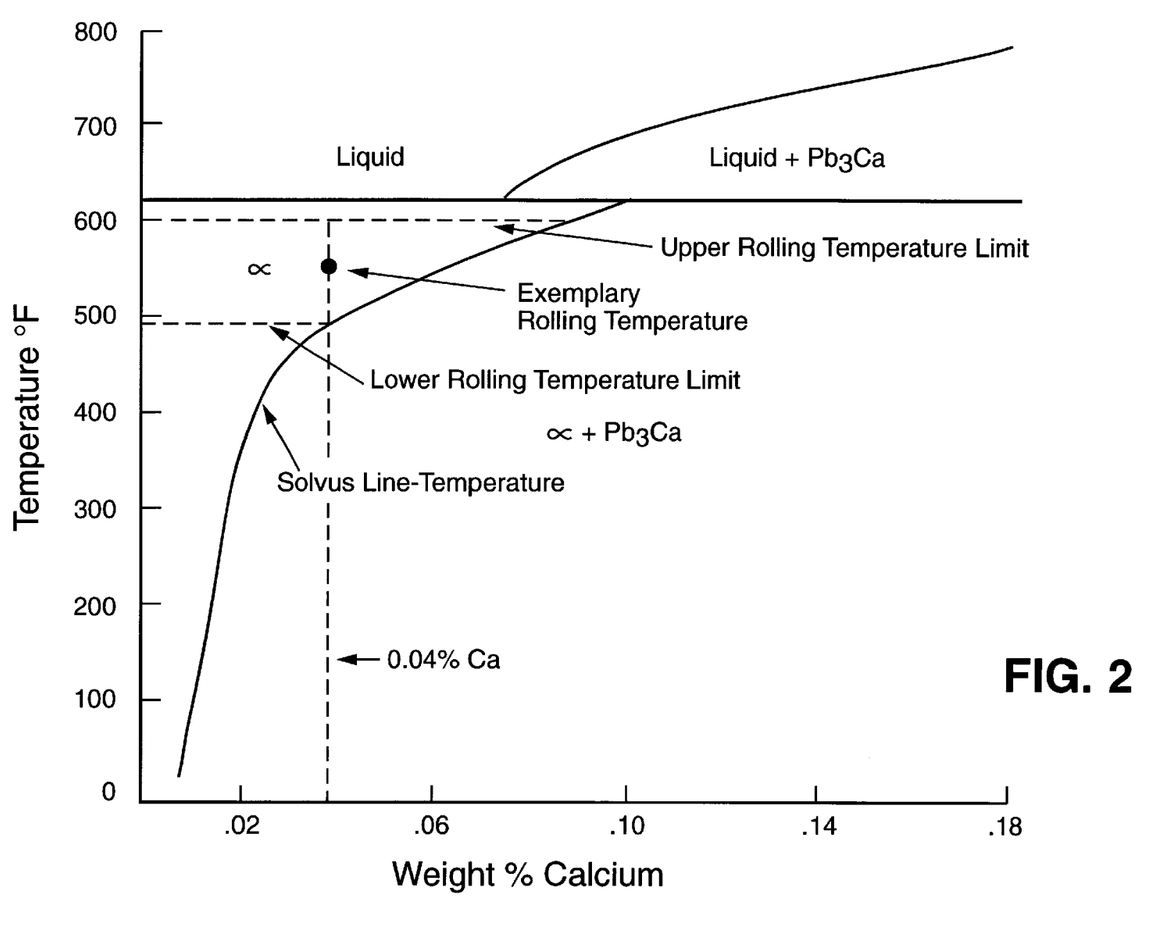
FIG. 2 is a lead-calcium phase diagram and illustrating the rolling temperature most preferred in the method of the present invention when the alloy contains 0.04 wt.% calcium.

In general, the solvus temperatures determined should yield a single-phase, lead-rich matrix and should at least minimize, if not eliminate, any grain-boundary embrittlement due to liquid-film formation at the grain boundaries of the cast billet. A satisfactory solvus temperature may be approximated using the Ca—Pb phase diagram, as shown in FIG. 2. The approximate solvus temperature for the various levels of calcium can be extrapolated from the phase diagrams as follows:

| Calcium Content | Equilibrium Solvus Temperature - F. |
|---|---|
| 0.02 | 378 |
| 0.03 | 459 |
| 0.04 | 500 |
| 0.05 | 525 |
| 0.06 | 540 |
| 0.065 | 562 |

However, as used herein, the term "solvus temperature" means the temperature determined by any of the following techniques which more precisely determine the solvus temperature of the specific alloy selected. These techniques comprise either determining the presence of a single phase, using x-ray diffraction to determine the desired lattice parameters or employing electrical resistivity measurements to determine the solvus temperature from the lowest value determined. More particularly, a series of cast tensile samples or 0.25 inch rods (3–5 inches in length) can be cast from the desired Ca—Sn—Ag—Pb alloy, keeping in mind the approximate solvus temperature (e.g., with a calcium content of 0.04%, having an approximate solvus temperature of 500° F., the four samples can use reheat temperatures of: 485° F., 495° F., 505° F., and 515° F.). Each sample is then reheated to one of the selected temperatures, held at the particular temperature for one hour, and then quenched in ice water. A metallurgical sample is then prepared immediately after quenching (i.e., cross-sectioning, polishing and etching the sample for microstructure examination). The solvus temperature will be that reheat temperature where no new phases are detected, and only the single phase, lead-rich solid solution is seen. The phase or phases present can be determined by microscopic examination as is known and used in the metallurgical field. Utilizing an optical microscope at an amplification of 100× to 400× or so will be adequate to allow the phase or phases present to be observed.

Another suitable technique involves using x-ray diffraction to determine the lattice parameters of the selected alloy using the quenched rod or other sample. Constancy of the measured lattice parameters indicate the presence of only a single phase, and the reheat temperature that yielded this condition will be the solvus temperature. An α-lead rich phase has a face-centered cubic ("FCC") structure, and the lattice parameter "a" of the FCC unit cell is: a=4.9495 Å (at 20–28° C.). If the sample reheat temperature corresponds to the solvus temperature, then the lattice parameter determined will be 4.9495 Å. If the lattice parameter deviates more than ±5% from this value, the sample has either a distorted α-lead rich crystal structure or may also contain a second phase precipitate like $Pb_3Ca$. The lattice parameter "a" of the single phase α-lead rich solid solution crystal lattice should have the same value of 4.9495 Å (±5%), regardless of the calcium content in the alloy of choice.

Still another useful technique involves determining the electrical resistivity of the quenched rods or other samples, immediately after quenching. Stable and low values of the electrical resistivity indicate the absence of undesired precipitates, and, hence, a single phase. The sample having the lowest electrical resistivity value gives the solvus temperature (i.e., the reheat temperature for that sample).

Next, as shown in FIG. 1, the alloy composition selected can be provided in the quantities necessary to make the cast billet thickness desired for the particular grid thickness. Suitable equipment for casting billets are known and may be utilized. Then, the alloy is cast into billets. As illustrative examples, the dimensions of the billet may be from 0.4–1.0 inch in thickness and have a width ranging from 2–5 inches up to 100 inches or so.

Pursuant to the present invention, the billet (preferably continuously cast) is then rolled to provide the desired strip thickness for the expanded grid at a preselected rolling temperature maintained during the rolling step. The rolling temperature selected should be, as a minimum, at least the solvus temperature; but, as a maximum, should be somewhat less than the peritectic temperature for this family of alloys (viz., about 600° F. or so, depending upon the calcium concentration in the alloy composition selected). The rolling temperature should be maintained in the desired range; and cooling, using water or other cooling medium, may be needed if the heat energy generated during the rolling process so requires.

More particularly, as a minimum, it is preferred to utilize a temperature at, or more preferably, somewhat above, the solvus temperature for the particular alloy so that the precipitation of any undesired phase is at least minimized, if not eliminated. Stated, differently, the preferred method of the present invention carries out the process of rolling the billet to provide the grid strip desired having a single-phase domain of the alloy selected, promoting the formation of a very supersaturated α-Pb rich matrix containing all the intermetallic phases of the solute element as completely soluble species.

Thus, what should be avoided in any event is sufficient precipitate formation that affects either the desired mechanical properties or the corrosion resistance. On the other hand, the rolling temperature used should not be so high as to cause undesired levels of elastic liquid phase present along the grain boundaries. Thus, if the rolling temperature is too close to the peritectic transformation temperature (i.e., about 320° C.), then it is possible to create a small quantity of a liquid phase. This liquid phase will lead to liquid phase embrittlement, and the cast billet can crack and fracture during rolling, and thus fail.

The rolling process itself can be carried out by using any of the conventionally known techniques, so long as the appropriate rolling temperature is maintained, as has been described herein. Similarly, the thickness of the grid strip obtained from the roll cast billets will, of course, vary depending upon the requirements of the particular type of battery and the specific application. For example, the thickness of the grids may vary from about 0.020 inches to about 0.060 inches for SLI battery applications to thicknesses of 0.1 inch or more for VRLA applications. The present invention is particularly useful for making grids where the desired grid thickness is at least 0.1 inch.

As may thus be appreciated, in view of the thickness of the cast billets typically being at least 0.4 inch and the desired thickness of the grids generally being much less than that, the entire thickness of the strip after completion of the rolling step will have been mechanically worked. This is preferred since this should provide a rolled strip having a homogeneous microstructure profile throughout, characterized by the presence only of the desired α-lead rich solid solution phase. However, as may be appreciated, and while all of the advantages of the preferred embodiment of this invention will not be achieved, advantages will result even when the reduction in thickness (i.e., the ratio between the thickness of the cast billet and the thickness of the rolled strip) is less than the 2:1–10:1 or more that is preferably utilized. Thus, some benefits may be achieved even with such ratios as low as 1:0.8 or so.

After the billet has been rolled to the desired strip thickness, the resulting strip should be immediately quenched so as to preserve the supersaturated solid solution. As an illustrative example, suitable quenching can be achieved using circulating cooling water having a temperature of, for example, from about 35° F. to about 45° F.

Optionally, the resulting grid strip can be kept in a relatively cool environment, e.g., at a temperature of less than about 60° F., until the grid is made from the strip by the desired technique so as to prevent age hardening during the grid-making procedure. This optional step will maintain the strip in a relatively soft, ductile condition in the non-aged state.

In accordance with yet another, and more preferred, aspect of the present invention, the corrosion resistance that the rolled strips will impart to positive grids made therefrom can be enhanced by treating the rolled strips so as to increase the population (i.e., concentration) of the special grain boundaries in such strips. Thus, the rolled strips (even when controlled pursuant to this invention) will contain numerous fragmented and highly oriented grain boundaries as well as a small fraction of what are termed "special grain boundaries."

These special grain boundaries comprise a mix of: (a) low angle grain boundaries with about 15° for atomic mismatch or orientation difference, and (b) coincidence-site grain boundaries. Such special grain boundaries have a lower grain boundary energy than the so-called random high angle grain boundaries.

As is well known, these special grain boundaries are more resistant to intergranular fracture and exhibit much superior corrosion resistance in comparison to the characteristics of random high angle grain boundaries which exhibit sensitivity to both intergranular crack formation and accelerated corrosion. Even when the strip is rolled and quenched according to this invention, the majority of the grain boundaries will likely be random with a high angle of atomic arrangement mismatch.

Thus, pursuant to the most preferred aspects of the present invention, the quenched rolled strip is rapidly heated (i.e., in less than about one hour or so) to a temperature in the range of about 200° F. to 500° F. and maintained at this temperature range for a time sufficient to allow the microstructure to be evolve, at which point the small population of special grain boundaries will have been increased at the expense of the large random high angle grain boundaries in the rolled strip. While the time necessary for this artificial heat aging will vary with the temperature and the strip thickness used, the evolution of the microstructure should occur in a few minutes up to about one hour or so. This evolved microstructure can be verified by examining the microstructure using scanning electron microscopy (SEM), transmission electron microscopy or x-ray stereographic projection of crystal planes. These techniques are known and are used for such microstructure examinations.

Rolled strips having been subjected to such a controlled artificial aging sequence will be characterized by a relatively large fraction of special grain boundaries (in comparison to the population prior to such treatment), a stable microstructure and an equiaxed grain structure. These microstructural characteristics will give rise to a rolled strip having outstanding mechanical properties and positive grids having, in service, outstanding high temperature corrosion resistance.

In making grids from the strip, this can be carried out immediately after the quenching step, if desired, or after the controlled heat aging sequence previously discussed. Alternatively, the rolled strip can be made into grids by expanded metal, die punching or other techniques after the strip has been filly age-hardened, either at ambient temperatures or at a higher predetermined temperature.

The preferred process flow in the wrought process of this invention is that described invention is that described herein, i.e., roll and quench, then, if used, artificially age the rolled quenched strip, and then fabricate into the grid. This process flow is efficient and economical.

However, it is within the scope of the present invention to first fabricate the grids from the rolled and quenched strip, and then carry out the artificial dying, on line or in a separate operation. While less preferred, this optional process flow does have the additional benefit of reducing, if not eliminating, residual stresses introduced during the grid expansion or other grid-fabricating stage.

The particular grid configuration and that of the lead-acid cells or batteries in which such positive grids are used can be varied as desired. Many configurations are known and may be used.

Figure 3:
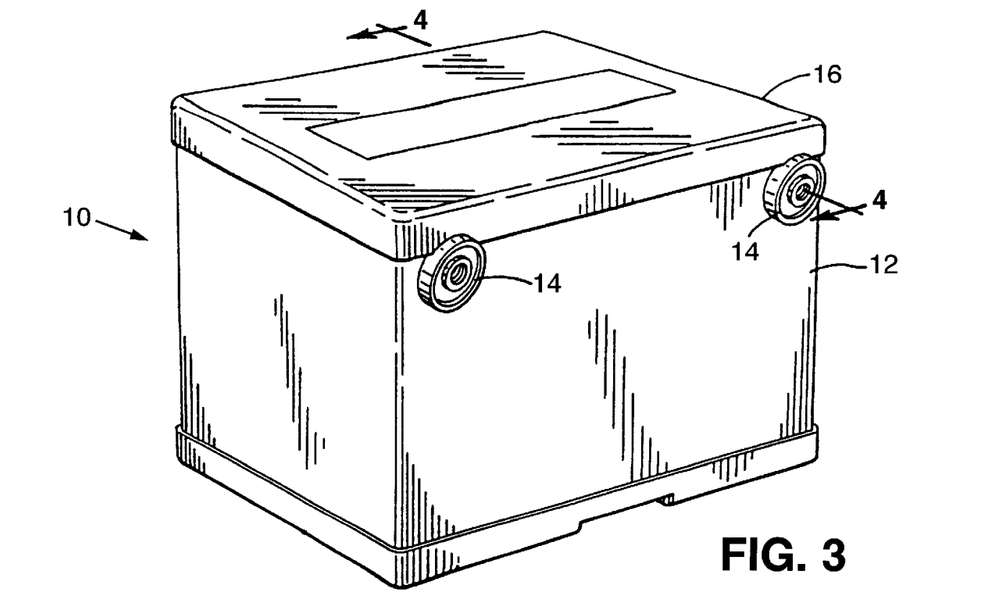
FIG. 3 is a perspective view of a maintenance-free battery of the present invention.
Figure 4:
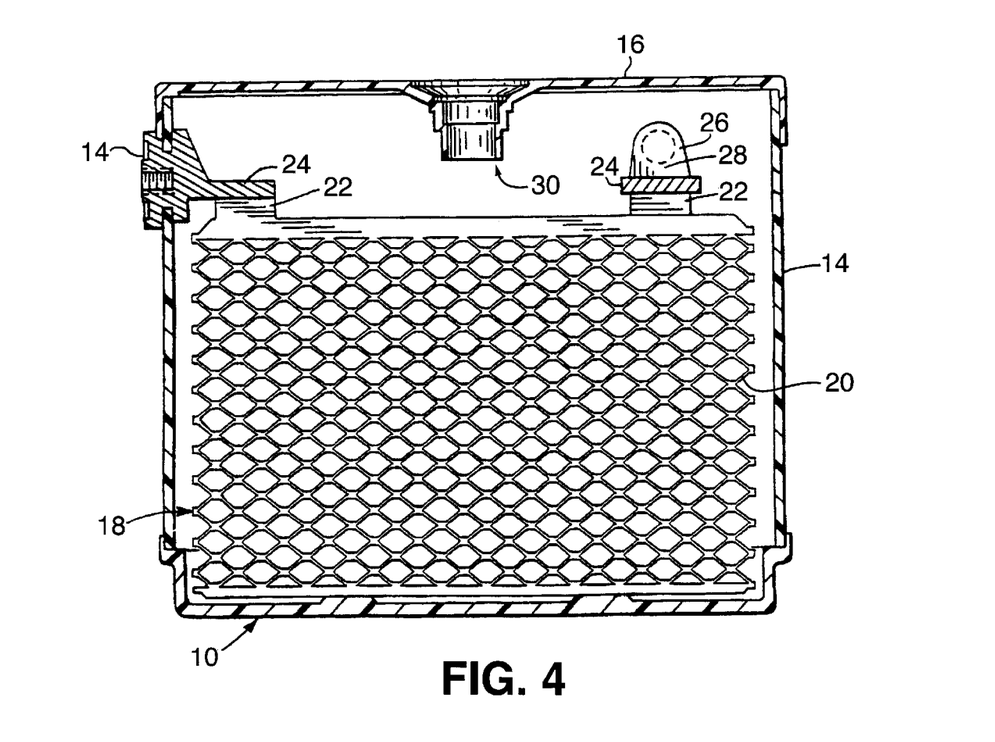
FIG. 4 is a cross-sectional view taken generally along line 4—4 of FIG. 3 and showing a battery grid made utilizing an alloy composition in accordance with the present invention.

As one illustrative example, FIGS. 3 and 4 show a maintenance-free battery utilizing the positive grids having of the present invention. Thus, a maintenance-free battery 10 is shown which includes a container 12, a pair of side terminal posts 14 and a cover 16 sealed to the container by any conventional means. The container is divided into a plurality of cells, a portion of one cell being shown in FIG. 4; and a battery element is disposed in each of these cells. The battery element comprises a plurality of electrodes and separators, one of the positive grids being shown generally at 18. The negative grids are of identical or similar construction but are formed from any desired antimony-free alloy. The electrode illustrated includes a supporting grid structure 20 having an integral lug 22 and a layer of active material pasted thereto; and a strap 24 joining the lugs 22 of the respective positive and negative grids together.

Intercell connectors are shown generally at 26 and include a "tombstone" 28 which forms a part of the strap 24. The strap 24 may be fused to the grid lugs 22 in assembling the components into an element as is known. The terminals 14 are similarly electrically connected through separate straps 24 to the supporting grid structure 20 during assembly, the base of the terminal forming a part of the strap 24. Suitable manifold venting systems for allowing evolved gases to escape in flooded electrolyte SLI batteries are shown at 30. Many satisfactory venting systems are well known. In addition, it is believed that all the present maintenance-free batteries manufactured in the United States will typically utilize flame retardant explosion-proof vent designs.

The particular design configurations of the battery may be varied as desired for the intended application. The positive grids described herein may be advantageously utilized in any type and size of lead-acid automotive battery. For example, the battery grids of the present invention may be advantageously used in dual terminal batteries such as those shown in U.S. Pat. No. 4,645,725. Similarly, while a battery having side terminals has been exemplified, the battery of this invention could comprise a top terminal battery.

The thickness of the positive grids can vary as is desired for a particular service life and a particular desired rated capacity, as previously noted. However, with any given thickness positive grid, the batteries utilizing the grids of the present invention will impart enhanced characteristics to the battery in comparison to conventional maintenance-free batteries having positive grids formed from previously used casting methods.

Figure 5:
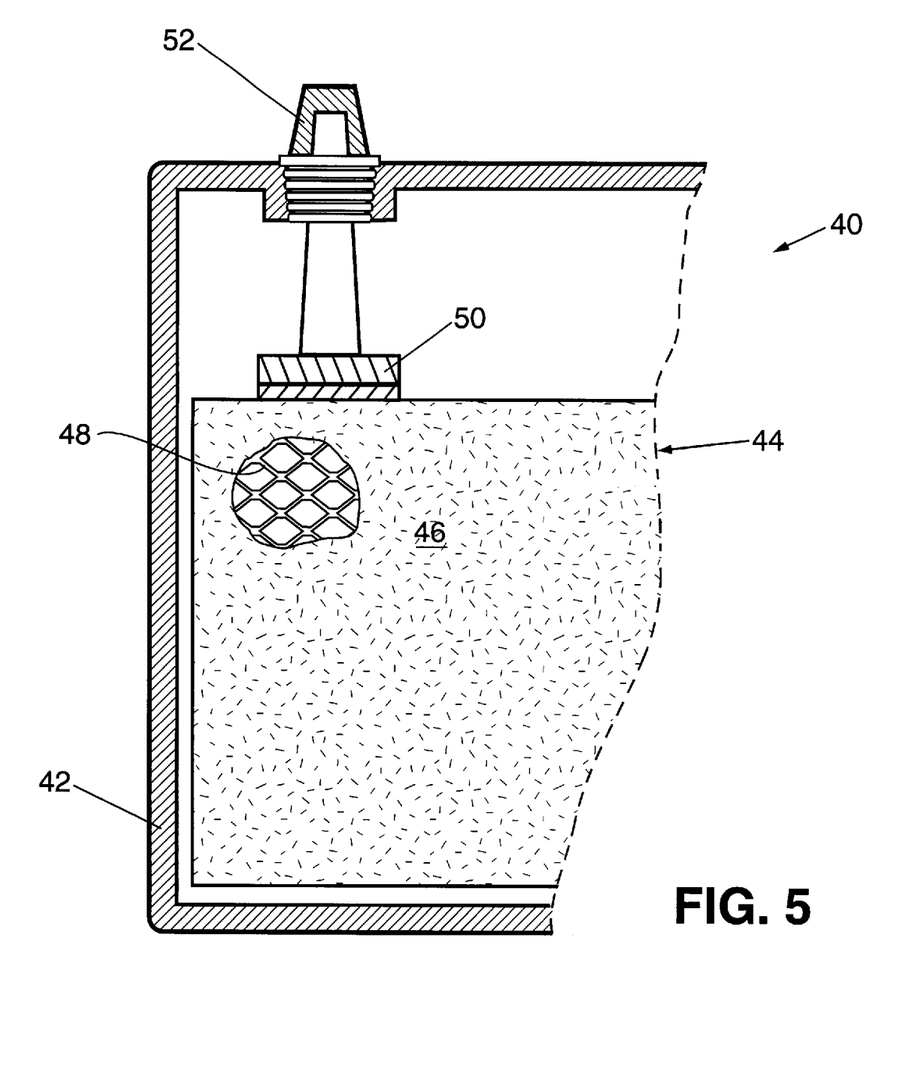
FIG. 5 is a side elevational, partial sectional view of a valve-regulated lead-acid (VRLA) cell showing the internal configuration.

FIG. 5 illustrates a lead-acid VRLA cell in accordance with the present invention. The cell 40 includes a container 42 having a series of positive and negative plates with an absorbent separator separating the plates. A positive plate shown generally at 44 comprises positive active material 46, partially broken away, to show the positive grid structure 48. Strap 50 is connected to terminal 52.

As previously discussed, the thickness of the plates will vary depending upon the application to which the cell is intended. An illustration of a useful range is from about 0.030 inch to about 0.300 inch, often 0.100 inch or more, but thinner or thicker plates may also be used. It is desired that the service life of the cell should be dictated by the thickness of the positive plates, as opposed to factors such as electrolyte or water loss or other modes of failure. If positive plate corrosion dictates the service life of the cell, the service life may be more readily predicted than for other modes of failure.

Preferably, the container is normally sealed from the atmosphere in use to provide an efficient oxygen recombination cycle as is known. The container should be able to withstand the pressure of the gases released during charging of the cell. Pressures inside the container may reach levels as high as, for example, 0.5–5.0 or 10.0 psig. Release venting is provided by a low pressure, a self-resealing relief valve, such as, for example, a bunsen valve. An example of such valve is illustrated in U.S. Pat. No. 4,401,730 to Szymborski et al.

An electrolyte is also included within the container. Preferably, the electrolyte is absorbed within the separator and the positive and negative active material. The electrolyte typically is sulfuric acid having a specific gravity in the range of about 1.240 to about 1.340, or even more, as is considered appropriate for a particular application.

The illustrative VRLA cell shown in FIG. 5 is only exemplary. The particular design and configuration of the VRLA cells used can vary as desired. The specific configuration does not form a part of the present invention.

Utilizing the method of the present invention should provide alloy strips and positive grids characterized by very stable, effective and uniform dispersion of precipitates in the matrix. In the preferred embodiment, the precipitate particles in the strip and grid will have a size principally in the range of from about 10 to about 100 nM. Utilizing the controlled rolling temperature, enhanced by (when used) the artificial aging, introduces a uniform dispersion of very fine $(AgSnPb)_3Ca$, $Ag_3Sn$, and other binary Ca—Ag and Ca—Sn precipitates within the grains and not at the grain boundaries. Still further, and desirably, the fragmented cast grains in the strip and grid will form equiaxed grain structure, or nearly so. Very low levels of residual stresses will be retained, and high microstructure stability and low recrystallization attributes at battery service temperatures can be achieved.

Additional attributes of the present invention provide strips and expanded or punched grids with fine precipitates having a very high level of crystal lattice compatibility and coherency between the precipitates and the lead-rich matrix. Such compatibility and coherency provide efficient and stable matrix strengthening. Very uniform and fine precipitate particles distribution in the matrix of the strip and grid will be provided. Additionally, the preferred method will achieve minimal grain structure orientation which will enhance the corrosion rate stability.

Higher strength, toughness, ductility, corrosion resistance and creep-rupture strength at both normal and higher service temperatures will be achieved in grids made using the method of the present invention. These characteristics are particularly suited for use as positive grids in VRLA cells and batteries that are intended for long-term duty service.

Still further, and importantly, grids made using the method of the present invention should exhibit highly uniform modes of corrosion penetration with minimal intergranular corrosion. These desirable characteristics allow a significant reduction in the grid thickness and weight of many applications. It is thus believed that the inherently higher corrosion resistance of strips and grids made using the method of the present invention should allow a reduction in grid thickness and weight in the range of from about 5% to 10% or so. As previously noted, such reductions provide a substantial economic benefit. For a given strip thickness, the corrosion resistance of these specially-processed strips will be far superior to the corrosion resistance that results from strips made from rolling processes having no, or inappropriate, process temperature control.

While particular embodiments of the invention have been shown, it will of course be understood that the invention is not limited thereto since modifications may be made by those skilled in the art, particularly in light of the foregoing teachings. Thus, while the present invention has been described in conjunction with SLI batteries and VRLA cells, it should be appreciated that the alloys disclosed herein may be used in any other lead-acid cells or batteries including, for example, bipolar and the like. Still further, while the present invention contemplates use, as a minimum, of a temperature for rolling of at least about the solvus temperature determined for the particular alloy, it should be appreciated that some of the advantages of the present invention can be achieved even when the rolling temperature is somewhat lower, resulting in some level of undesirable precipitates. Such less-than-desirable rolling temperatures particularly can be tolerated when the controlled heat aging sequence described herein is utilized. Even further, while the optimum and most preferred embodiment of the present invention utilizes the controlled rolling process together with the heat aging sequence, it should be appreciated that using the heat aging sequence by itself may provide adequate benefits for some applications, even when a substantially less than desired rolling step has been used.

Further, the present invention has been principally described in conjunction with strips made from quaternary Ca—Sn—Ag—Pb alloys; and these alloys are preferred, now being in widespread commercial use. However, and, while less preferred, the present invention can certainly be utilized with ternary Ca—Sa—Pb alloys. Such ternary alloys and useful compositions are known and are being used commercially to make lead-acid battery grids with a wrought process.

Still further, while the present invention has been described in conjunction with a process in which the cast strip is thicker, typically much thicker, than the desired grid thickness, it should be appreciated that the invention is not so limited. Thus, various processes are known wherein the strip is directly cast at the thickness desired for the grid.

One illustrative example is shown in U.S. Pat. No. 4,315,357 to Laurie et al. which illustrates, in general, a method and apparatus for forming the expanded mesh strip necessary for making a continuously cast grid. Equipment for making the directly cast strip and processing into an expanded mesh strip is commercially available (Cominco Ltd., Toronto, Canada).

The strips, and the resulting grids, are characterized by highly columnar grid microstructures that would be indicative of positive grids having relatively high susceptibility to high temperature corrosion resistance. Yet, in accordance with U.S. Pat. No. 5,434,025 to Rao et al., the use of appropriate Ca—Sn—Ag lead-based positive grid alloys achieve surprising performance, even with such columnar grid microstructures.

However, the high temperature corrosion resistance and mechanical properties can be even further enhanced by utilizing the process of the present invention, at least a controlled rolling step and, preferably, also a controlled artificial aging step. Thus, rather than directly casing the strip at the grid thickness, the strip is directly cast at a thickness greater than the desired grid thickness so that a controlled temperature rolling step can be carried out to reduce the thickness by at least 20%, based upon the directly cast thickness. Preferably, the thickness can be reduced up to 100% or so in order to insure that the strip is mechanically worked throughout. A limiting factor will be the thickness at which strips of satisfactory quality can be directly cast, thicknesses in excess of 0.1 inch or so being more difficult to satisfactorily produce. Accordingly, the use of such directly cast strips is preferably utilized for positive grids having a desired thickness of 0.025–0.06 inch.

It will be preferable to utilize a controlled artificial aging step, as well, pursuant to this invention. In this fashion, use of the present invention with such directly cast strips will break up and fragment the columnar grid structure, providing a more equiaxed grain structure characterized by an idealized precipitate formation, as previously described.

I claim:

1. A method for making positive grids for lead-acid batteries from calcium-tin-silver lead-based alloys and having a desired thickness which comprises selecting the alloy composition, casting the alloy selected into a strip having a thickness greater than the desired grid thickness, rolling the strip to the desired grid thickness while maintaining the strip at a temperature in the range of at least about the solvus temperature up to less than the peritectic temperature of the alloy selected, quenching the thus-rolled strip, and fabricating positive grids from the rolled strip.

2. The method of claim 1 wherein the strip is continuously cast.

3. The method of claim 1 wherein the alloy composition selected comprises about 0.025% to 0.065% calcium, 0.4% to 1.9% tin, about 0.015% to 0.050% silver, and the remainder lead, the percentages being based upon the weight of the alloy.

4. The method of claim 3 wherein the alloy composition selected comprises 0.035% to 0.065% calcium, 0.5% to 1.5% tin and 0.02% to 0.045% silver.

5. The method of claim 1 wherein the quenched rolled strip is thereafter heated to a temperature in the range of 200° F. to 500° F.

6. The method of claim 1 wherein the grid thickness is at least 0.1 inch.

7. The method of claim 1 wherein the grid thickness is from about 0.025 to 0.06 inch.

8. The method of claim 1 wherein the ratio of the strip thickness to the grid thickness is at least 2:1.

* * * * *